United States Patent
Carmel et al.

(10) Patent No.: US 9,042,670 B2
(45) Date of Patent: May 26, 2015

(54) DOWNSIZING AN ENCODED IMAGE

(75) Inventors: Sharon Carmel, Ramat HaSharon (IL); Dror Gill, Haifa (IL); Tamar Shoham, Netanya (IL)

(73) Assignee: Beamr Imaging Ltd, Tel Aviv (IL)

( * ) Notice: Subject to any disclaimer, the term of this patent is extended or adjusted under 35 U.S.C. 154(b) by 137 days.

(21) Appl. No.: 13/823,995

(22) PCT Filed: Sep. 15, 2011

(86) PCT No.: PCT/IL2011/000733
§ 371 (c)(1),
(2), (4) Date: Mar. 15, 2013

(87) PCT Pub. No.: WO2012/035534
PCT Pub. Date: Mar. 22, 2012

(65) Prior Publication Data
US 2013/0170764 A1    Jul. 4, 2013

Related U.S. Application Data

(60) Provisional application No. 61/383,750, filed on Sep. 17, 2010, provisional application No. 61/453,726, filed on Mar. 17, 2011.

(30) Foreign Application Priority Data

Oct. 5, 2010  (WO) ............... PCT/IL2010/000809

(51) Int. Cl.
*G06K 9/46* (2006.01)
*G06T 9/00* (2006.01)
(Continued)

(52) U.S. Cl.
CPC ............. *G06T 9/007* (2013.01); *H04N 19/60* (2014.11); *H04N 19/132* (2014.11); *H04N 19/186* (2014.11); *H04N 19/154* (2014.11); *H04N 19/18* (2014.11); *H04N 19/40* (2014.11)

(58) Field of Classification Search
USPC ................. 382/232, 233, 241, 250, 251, 252; 623/1.1, 1.12, 1.13, 1.15
See application file for complete search history.

(56) References Cited

U.S. PATENT DOCUMENTS 5,708,732 A    1/1998  Merhav et al.
5,845,015 A   12/1998  Martucci
(Continued)

FOREIGN PATENT DOCUMENTS

EP         1398955 A2     3/2004

OTHER PUBLICATIONS http://en.wikipedia.org/wiki/JPEG, Sep. 2010.
Ramos, M. de Queiroz, R.L., "Adaptive rate-distortion-based thresholding: application in JPEG compression of mixed images for printing", Acoustics, Speech and Signal Processing, 1999, vol. 5.

(Continued)

*Primary Examiner* — Anh Do
(74) *Attorney, Agent, or Firm* — Browdy and Neimark, PLLC

(57) ABSTRACT

There is provided a system, a computer program product, program storage device readable by machine, and a method of downsizing an input disjoint block level encoded image. According to examples of the presently disclosed subject matter, the method can include calculating a DCT downsize ratio for downsizing the input image in a DCT domain according to a target downsize ratio and according to a size of a DCT transform length associated with the input image; adapting an I-DCT according to the DCT domain downsize ratios; performing the adapted I-DCT; providing an intermediate image as output of a DCT domain process; and applying a pixel domain interpolation to the intermediate image according to dimensions of the intermediate image and according to dimensions of the target image.

30 Claims, 6 Drawing Sheets

(51) Int. Cl.
*H04N 19/60* (2014.01)
*H04N 19/132* (2014.01)
*H04N 19/186* (2014.01)
*H04N 19/154* (2014.01)
*H04N 19/18* (2014.01)
*H04N 19/40* (2014.01)

(56) References Cited

U.S. PATENT DOCUMENTS

| | | |
|---|---|---|
| 6,233,359 B1 | 5/2001 | Ratnakar et al. |
| 6,252,994 B1 | 6/2001 | Nafarieh |
| 6,807,310 B1 | 10/2004 | Dugad et al. |
| 6,982,762 B1 | 1/2006 | Hui |
| 7,027,507 B2 | 4/2006 | Wu |
| 7,050,656 B2 | 5/2006 | Bhaskaran et al. |
| 7,570,819 B2 * | 8/2009 | Sung et al. ............. 382/232 |
| 7,978,934 B2 | 7/2011 | Yu et al. |
| 7,998,188 B2 * | 8/2011 | Zilla et al. ............. 623/1.13 |
| 8,233,727 B2 | 7/2012 | Wang et al. |
| 8,382,814 B2 * | 2/2013 | Zilla et al. ............. 623/1.13 |
| 8,747,451 B2 * | 6/2014 | Zilla et al. ............. 623/1.13 |
| 8,805,109 B2 * | 8/2014 | Carmel et al. ............. 382/252 |
| 2001/0019630 A1 | 9/2001 | Johnson |
| 2003/0035586 A1 | 2/2003 | Chou et al. |
| 2004/0013195 A1 | 1/2004 | Panusopone et al. |
| 2004/0136600 A1 | 7/2004 | Yfantis |
| 2004/0217956 A1 | 11/2004 | Besl et al. |
| 2005/0175093 A1 | 8/2005 | Haskell et al. |
| 2006/0008164 A1 | 1/2006 | Wu et al. |
| 2007/0237414 A1 | 10/2007 | Cho et al. |

OTHER PUBLICATIONS

Kannan Ramchandran and Martin Vetterli, "Rate-Distortion Optimal Fast Thresholing with comlete JPEG/MPEG Decoder compatability", IEEE Transactions on Image Processing, vol. 3, No. 5 (Sep. 1994).

Takeo Omori, Kazuhiko Fukazawa et al., "Novel Inspection Technology for Half Pitch 55 nm and Below," SPIE vol. 5752, pp. 174-182, 2005.

B. Planitz and A. Maeder; "Medical Image Watermarking: A Study on Image Degradation," e-Health Research Centre, 2005.

Merhav et al., "Fast Algorithms for DCT-Domain Image Downsampling and for Inverse Motion Compensation" Circuits and Systems for Video Technology, IEEE Transactions on 7.3 (1997) 468-476.

Dugad et al. "A Fast Scheme for Image Size Change in the Compressed Domain" Circuits and Systems for Video Technology, IEEE Transactions on 11(4) 461-474, Apr. 2001.

Mukhopadhyay et al. "Resizing of DCT-Based Compressed Images", proc. of the 4th Int. Conf. on Digital Signal Proc. and Applications (DSPA), Moscow, Russia 386-389, 2002.

Park et al "Design and Analysis of an Image Resizing Filter in the Block-DCT Domain" Circuits and Systems for Video Technoloty, IEEE Transctions on 14(2), 274-279, Feb. 2004.

http://www.cambridgeincolour.com/tutorials/image-interpolation.htm, Dec. 2014.

Muramatsu et al. "Resolution Conversion Method with Arbitrary Rational Values for Transform-Coded Images" Electronics and Communication in Japan Part III—Fundamental electronic Science, Wiley, Hoboken NJ. vol. 77(10), Oct. 1, 1994, 37-48.

* cited by examiner

DOWNSIZING AN ENCODED IMAGE

FIELD OF THE INVENTION

The present invention is in the field of encoded digital image processing.

SUMMARY OF THE INVENTION

Many of the functional components of the presently disclosed subject matter can be implemented in various forms, for example, as hardware circuits comprising custom VLSI circuits or gate arrays, or the like, as programmable hardware devices such as FPGAs or the like, or as a software program code stored on an intangible computer readable medium and executable by various processors, and any combination thereof. A specific component of the presently disclosed subject matter can be formed by one particular segment of software code, or by a plurality of segments, which can be joined together and collectively act or behave or act according to the presently disclosed limitations attributed to the respective component. For example, the component can be distributed over several code segments such as objects, procedures, and functions, and can originate from several programs or program files which operate in conjunction to provide the presently disclosed component.

In a similar manner, a presently disclosed component(s) can be embodied in operational data or operation data can be used by a presently disclosed component(s). By way of example, such operational data can be stored on tangible computer readable medium. The operational data can be a single data set, or it can be an aggregation of data stored at different locations, on different network nodes or on different storage devices.

The method or apparatus according to the subject matter of the present application can have features of different aspects described above or below, or their equivalents, in any combination thereof, which can also be combined with any feature or features of the method or apparatus described in the Detailed Description presented below, or their equivalents.

Examples of the presently disclosed subject matter relate to a method and a system for downsizing an input disjoint block level encoded image. According to an aspect of the presently disclosed subject matter, there is provided a method of downsizing an input disjoint block level encoded image. According to examples of the presently disclosed subject matter, the method can include calculating a DCT downsize ratio for downsizing the input image in a DCT domain according to a target downsize ratio and according to a size of a DCT transform length associated with the input image; adapting an I-DCT according to the DCT domain downsize ratios; performing the adapted I-DCT; providing an intermediate image as output of a DCT domain process; and applying a pixel domain interpolation to the intermediate image according to dimensions of the intermediate image and according to dimensions of the target image.

According to examples of the presently disclosed subject matter, calculating can include computing the DCT domain downsize ratio based on a length of the DCT transform and based on the target downsize ratio, for each dimension of the input image.

Further by way of example, adapting an I-DCT can include adapting one or both of a horizontal inverse transform length and a vertical inverse transform length, according to the calculated DCT domain downsize ratio. Still further by way of example, adapting an I-DCT can include reducing one or both of a horizontal inverse transform length and a vertical inverse transform length, according to the calculated DCT domain downsize ratios.

According to examples of the presently disclosed subject matter, the method can also include configuring a DCT anti-aliasing filter ("AAF") according to the target downsize ratio, and adapting an I-DCT can include applying the DCT AAF to DCT coefficients corresponding to the input image.

Further by way of example, the method can include configuring a DCT AAF according to the target downsize ratio, and adapting an I-DCT can include applying the DCT AAF to DCT coefficients corresponding to the input image prior to said performing the adapted I-DCT.

According to examples of the presently disclosed subject matter, the method can include performing an additional DCT after performing the adapted I-DCT; configuring a DCT AAF according to the target downsize ratio and according to dimensions of the image after the adapted I-DCT; applying the DCT AAF to DCT coefficients corresponding to the image after the adapted I-DCT, giving rise to filtered DCT coefficients; and performing I-DCT over the filtered DCT coefficients giving rise to the intermediate image.

According to examples of the presently disclosed subject matter, calculating a DCT domain downsize ratio can include: computing a ceiling expression over a ratio among the DCT transform length associated with the input image and the target downsize ratio, for each dimension of the input image, and computing a ratio between the DCT transform length associated with the input image and the ceiling expression, for each dimension of the input image.

According to examples of the presently disclosed subject matter, when the target downsize ratio received as input is larger than two implementing a multi-iteration DCT downsizing process. By way of example, the multi-iteration DCT downsizing process can include: setting the DCT domain downsize ratio to two for one or both dimensions of the input image; reducing one or both of a horizontal I-DCT transform length and a vertical I-DCT transform length by a factor of two according to the DCT domain downsize ratio; as part of performing the adapted I-DCT comprises dividing the target downsize ratio by two for one or both dimensions of the input image; and repeatedly performing the DCT downsize process for one or both dimensions of the input image as long as the target downsize ratio following a previous iteration of the process is larger than two for one or both dimensions of the input image, respectively.

Further by way of example, after performing the adapted I-DCT of a final iteration of the multi-iteration DCT downsizing process, performing an additional DCT. Configuring a DCT AAF according to the target downsize ratio and according to dimensions of the image after the adapted I-DCT of the final iteration of the multi-iteration DCT downsizing process, and applying the DCT AAF to DCT coefficients corresponding to the image after the adapted I-DCT of the final iteration of the multi-iteration DCT downsizing process, giving rise to filtered DCT coefficients. Performing I-DCT over the filtered DCT coefficients giving rise to the intermediate image.

Still further by way of example, as part of a final iteration of the multi-iteration DCT downsizing process, configuring a DCT AAF according to the target downsize ratio, and applying the DCT AAF prior to performing the adapted I-DCT with respect to DCT coefficients corresponding to a result of a previous iteration of the multi-iteration DCT downsizing process.

According to examples of the presently disclosed subject matter, applying a pixel domain interpolation to the intermediate image can include computing a pixel domain downsize ratio according to the dimensions of the intermediate image and the target image dimensions or according to the DCT domain downsize ratio and the target downsize ratio. Further by way of example, the pixel domain downsize ratio can correspond to the difference between the target downsize ratio and the size of the intermediate image.

According to examples of the presently disclosed subject matter, applying a pixel domain interpolation to the intermediate image can include configuring an adaptive support pixel domain interpolator according to the pixel domain downsize ratio, and applying the adaptive support pixel domain interpolator to intermediate image. Further by way of example, the adaptive support pixel domain interpolator can be applied only to the Luma component of the intermediate image. Further by way of example, applying a pixel domain interpolation to the intermediate image can include configuring a non-adaptive support pixel domain interpolator according to the pixel domain downsize ratio, and applying the non-adaptive support pixel domain interpolator to intermediate image. Still further by way of example, the non-adaptive support pixel domain interpolator can be applied only to the Chroma components of the intermediate image. The use of the non-adaptive support pixel domain interpolator with respect to the Chroma components of the intermediate image can be in combination with the use of adaptive support pixel domain interpolator with respect to the Luma component of the intermediate image.

According to a further aspect of the presently disclosed subject matter, there is provided a system for downsizing an input disjoint block level encoded image. According to examples of the presently disclosed subject matter, a system for downsizing an input disjoint block level encoded image can include a DCT domain processor and a pixel domain processor. The DCT domain processor can be adapted to implement a DCT domain process. The DCT domain processor can include a DCT downsize configurator and an I-DCT engine. The DCT downsize configurator can be adapted to calculate a DCT downsize ratio for downsizing the input image in a DCT domain. The DCT downsize configurator can be adapted to calculate the DCT downsize ratio according to a target downsize ratio and according to a size of a DCT transform length associated with the input image. The I-DCT engine can be configured to adapt an I-DCT operation according to the DCT domain downsize ratio. The DCT domain processor can be adapted to provide an intermediate image as output of the DCT domain process. The pixel domain processor can be adapted to apply a pixel domain interpolation operation to the intermediate image according to dimensions of the intermediate image and according to dimensions of the target image.

According to examples of the presently disclosed subject matter, the DCT downsize configurator is adapted to compute the DCT domain downsize ratio based on a length of the DCT transform and based on the target downsize ratio, for each dimension of the input image. Further by way of example, the I-DCT engine can be configured to adapt one or both of a horizontal inverse transform length and a vertical inverse DCT transform length, according to the calculated DCT domain downsize ratio.

According to examples of the presently disclosed subject matter, the I-DCT engine can be adapted to reduce one or both of a horizontal inverse transform length and a vertical inverse transform length, according to the calculated DCT domain downsize ratios.

Further by way of example, the DCT domain processor can include a DCT anti-aliasing filter ("AAF"). The DCT AAF can be configured to apply a DCT AAF according to the target downsize ratio.

According to examples of the presently disclosed subject matter, the DCT AAF can be configured to apply a DCT AAF according to the target downsize ratio. The DCT AAF can be configured to apply the DCT AAF to DCT coefficients corresponding to the input image prior to the operation of said I-DCT engine.

According to further examples of the presently disclosed subject matter, the DCT AAF can be configured according to the target downsize ratio and according to dimensions of the image after the I-DCT operation. The DCT AAF can be adapted to apply a DCT AAF to DCT coefficients computed after the I-DCT operation giving rise to filtered DCT coefficients. An additional I-DCT operation can be applied to the filtered DCT coefficients, giving rise to the intermediate image.

According to examples of the presently disclosed subject matter, the DCT downsize configurator can be adapted to compute a ceiling expression over a ratio among the DCT transform length associated with the input image and the target downsize ratio, for each dimension of the input image, and to compute a ratio between the DCT transform length associated with the input image and the ceiling expression, for each dimension of the input image.

According to examples of the presently disclosed subject matter, when the target downsize ratio received as input is larger than two, the DCT domain processor can be adapted to implement a multi-iteration DCT downsizing process. By way of example, the DCT downsize configurator can be adapted to set the DCT domain downsize ratio to two for one or both dimensions of the input image, and accordingly dividing the target downsize ratio by two for one or both dimensions of the input image, respectively. The I-DCT engine can be configured to adapt an I-DCT operation according to the DCT domain downsize ratio. The DCT downsize configurator and the I-DCT engine can be configured to repeat a DCT downsizing process as long as the target downsize ratio following a previous iteration of the process is larger than two for one or both dimensions of the input image.

Further by way of example, the DCT domain processor can be adapted to perform an additional DCT after the final iteration of the multi-iteration DCT downsizing process. The DCT AAF can be configured according to the target downsize ratio and according to dimensions of the image after the adapted I-DCT of the final iteration of the multi-iteration DCT downsizing process. The DCT AAF is configured to applying the DCT AAF to DCT coefficients corresponding to the image after the adapted I-DCT of the final iteration of said multi-iteration DCT downsizing process, giving rise to filtered DCT coefficients. The DCT domain processor can be adapted to perform I-DCT over the filtered DCT coefficients giving rise to the intermediate image.

Still further by way of example, as part of a final iteration of the multi-iteration DCT downsizing process, the DCT AAF can be configured according to the target downsize ratio. The DCT AAF can be configured to apply a DCT AAF prior to the I-DCT engine performing the adapted I-DCT with respect to DCT coefficients corresponding to a result of a previous iteration of said multi-iteration DCT downsizing process.

According to examples of the presently disclosed subject matter, the pixel domain processor can be adapted to compute a pixel domain downsize ratio according to the dimensions of the intermediate image and the target image dimensions or according to the DCT domain downsize ratio and the target downsize ratio.

Further by way of example, the pixel domain downsize ratio can correspond to the difference between the target downsize ratio and the size of the intermediate image.

Still further by way of example, the pixel domain processor can be adapted to configure an adaptive support pixel domain interpolation algorithm according to the pixel domain downsize ratio. The pixel domain processor can be adapted to use the adaptive support pixel domain algorithm for downsizing the intermediate image.

Yet further by way of example, the pixel domain processor can include a Luma pixel domain downsize module. The Luma pixel domain downsize module can be configured to apply a pixel domain interpolation operation to the Luminance component of the intermediate image. The Luma pixel domain downsize module can be adapted to use an adaptive support pixel domain interpolation algorithm and can be adapted to use the adaptive support pixel domain algorithm for downsizing the Luma component of the intermediate image.

According to a further aspect of the presently disclosed subject matter there is provided a program storage device readable by machine, tangibly embodying a program of instructions executable by the machine to perform a method of downsizing an input disjoint block level encoded image according to the herein provided examples. According to yet another aspect of the presently disclosed subject matter, there is provided a computer program product comprising a computer useable medium having computer readable program code embodied therein of downsizing an input disjoint block level encoded image according to the herein provided examples.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

Figure 1:
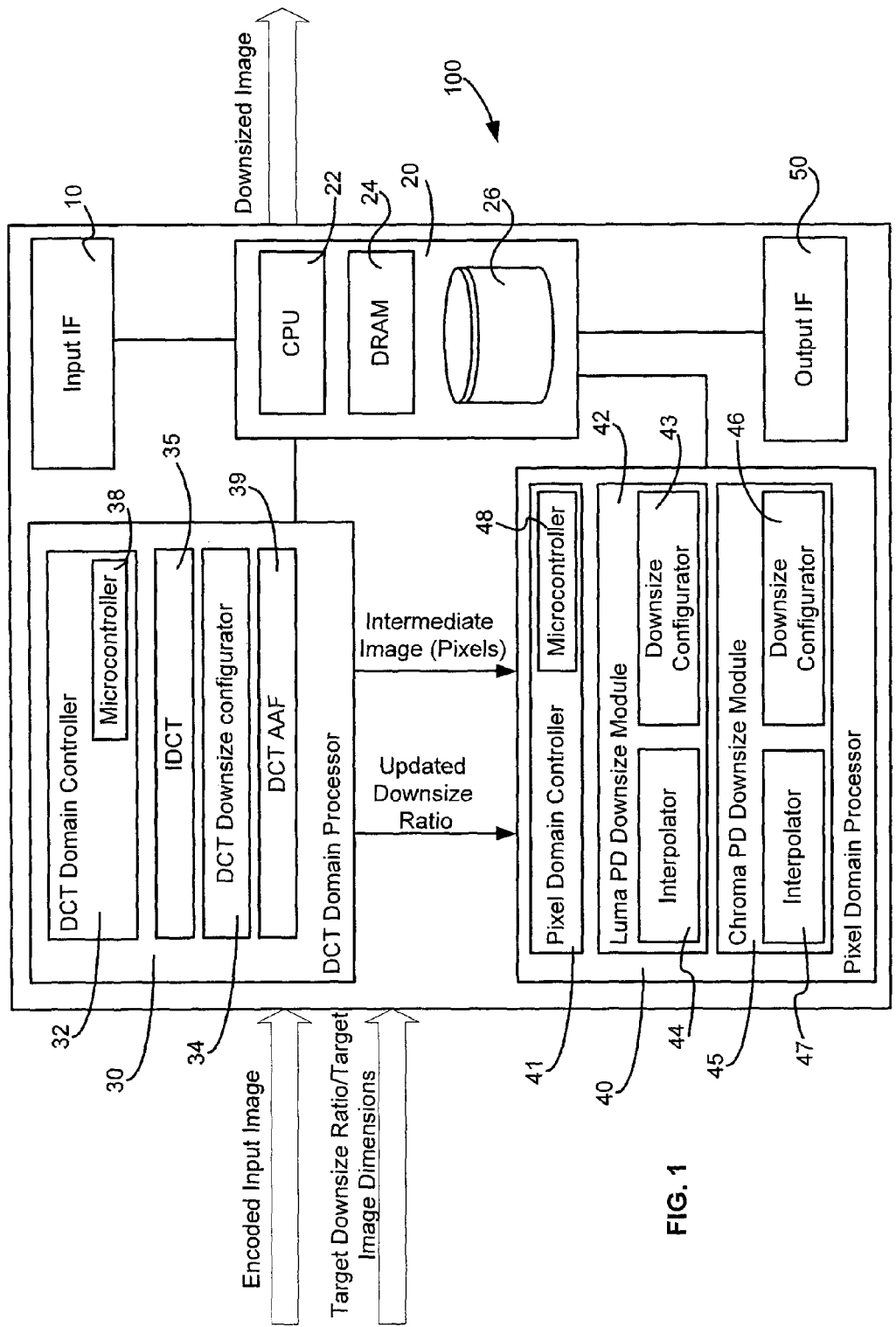
FIG. 1 is a block diagram illustration of a system for downsizing an input disjoint block level encoded image, according to examples of the presently disclosed subject matter.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the presently disclosed subject matter. However, it will be understood by those skilled in the art that the presently disclosed subject matter may be practiced without these specific details. In other instances, well-known methods, procedures and components have not been described in detail so as not to obscure the presently disclosed subject matter.

Unless specifically stated otherwise, as apparent from the following discussions, it is appreciated that throughout the specification discussions various functional terms refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such tangible information storage, transmission or display devices.

Provided below is a list of conventional terms in the field of image processing and in the field of digital image resizing or downsizing. For each of the terms below a short definition is provided in accordance with each of the term's conventional meaning in the art. The terms provided below are known in the art and the following definitions are provided as a non-limiting example only for convenience purposes. Accordingly, the interpretation of the corresponding terms in the claims is, unless stated otherwise, is not limited to the definitions below, and the terms used in the claims should be given their broadest reasonable interpretation.

Throughout the description of examples of the presently disclosed subject matter and in the claims, reference is made to the term "disjoint block level encoded image". A disjoint block level encoded image is a result of a compression process that involves independent coding of disjoint blocks in a precursor image. A disjoint block level encoded image includes or is associated with a set of discrete cosine transform ("DCT") coefficients which are generated or selected in the compression or encoding process of the precursor image. A non-limiting example of a disjoint block level encoded image is a JPEG image. The compression of images to JPEG format involves an 8×8 DCT transformation.

Throughout the description of examples of the presently disclosed subject matter and in the claims, reference is made to the term "pixel domain resize". By way of example, a pixel domain resize can be defined as a process of reducing an image's spatial resolution by an operation carried out directly on pixel values of a precursor image. Each target image pixel is derived from one or more pixels of a precursor image. For instance, a target pixel can be a weighted average (interpolation) of a set of pixels in a precursor image which (in the precursor image) were in a certain vicinity. In the description of some examples of the presently disclosed subject matter and in some of the claims, a distinction is made between two types of pixel domain resize, namely between adaptive support pixel domain interpolation and non-adaptive or fixed support pixel domain interpolation.

By way of example, a non-adaptive or fixed support pixel domain interpolation can be defined as a pixel domain interpolation process wherein each target pixel is derived from a pre-determined number of original image pixels, regardless of the resize ratio. In general terms, and by way of example, characteristics of non-adaptive support pixel domain interpolation include low complexity (e.g., compared to adaptive support pixel domain interpolation) and susceptibility of aliasing artifacts, in particular for relatively large downsize ratios (e.g., compared to adaptive support pixel domain interpolation). Non limiting examples of non-adaptive or fixed support pixel domain interpolation methods include: Nearest neighbor (using a single original pixel value copied to target), Bi-linear (uses 1 pixel from either side) and fixed support Lanczos (where, for instance, for 3 lobed one can used a fixed support of 6 original pixels to create a target pixel, e.g., as in the IPP Lanczos implementation).

By way of example adaptive support pixel domain interpolation can be defined as a pixel domain interpolation method wherein each target pixel is derived from N original pixels, where N is a non-decreasing function of the resize factor. Accordingly, resize by a larger factor incurs an interpolation function that uses more original pixels or increases the size of the interpolation kernel/filter support. In general terms, and by way of example, characteristics of adaptive support pixel domain interpolation include high complexity (e.g., compared to non-adaptive support pixel domain interpolation) that increases with resize ratios and generally good resiliency against aliasing artifacts (e.g., compared to non-adaptive support pixel domain interpolation). Non limiting examples of adaptive or fixed support pixel domain interpolation methods include: Lanczos with adaptive kernels (such as the ImageMagick implementation) and IPP super-sampling.

Throughout the description of examples of the presently disclosed subject matter and in the claims, reference is made to the term "DCT domain resize". By way of example, a DCT domain resize can be defined as a process of reducing an image's spatial resolution by an operation carried out on the block DCT coefficients corresponding to the original image. Further by way of example, in a DCT domain resize includes performing a reduced dimension I-DCT. Thus, each original DCT block can be inverse transformed to a smaller block of corresponding pixels. Non-limiting examples of resize (or downsize) systems and algorithms that use DCT domain resize include the following U.S. Pat. Nos. 5,708,732, 6,807, 310, 5,845,015 and 7,050,656 and the following paper: YoungSeo Park and HyunWook Park. (2004). Design and Analysis of an Image Resizing Filter in the Block-DCT Domain. IEEE transactions on circuits and systems for video technology. vol. 14, no 2, pp. 274-279.

Throughout the description of examples of the presently disclosed subject matter and in the claims, reference is made to the term "anti-aliasing filter". By way of example, an anti-aliasing filter ("AAF") can be defined as a filter that is employed prior to, or as part of, a pixel domain downsize process. The AAF removes high frequency content in the original image that may cause an aliasing artifact in the reduced size image. Further by way of example, the AAF may be applied as part of the DCT domain processing prior to pixel-domain processing. Typically, an anti-aliasing filter operates by removing high frequency content in the original image to approximately satisfy the sampling theorem.

Some examples of the presently disclosed subject matter relate to a system and a method of downsizing an input disjoint block level encoded image. A method of downsizing an input disjoint block level encoded image, can include, according to some examples of the presently disclosed subject matter: calculating a DCT domain downsize ratio for downsizing the input image in a DCT domain; adapting an I-DCT according to the DCT domain downsize ratios; performing the adapted I-DCT giving rise to an intermediate image; and applying a pixel domain interpolation to the intermediate image. Further by way of example, the DCT domain downsize ratio can be calculated according to a target downsize ratio and according to a size of a DCT transform length associated with the input image. Still further by way of example, pixel domain interpolation can be applied to the intermediate image according to dimensions of the target image.

Reference is now made to FIG. 1, which is a block diagram illustration of a system for downsizing an input disjoint block level encoded image, according to examples of the presently disclosed subject matter. According to examples of the presently disclosed subject matter, a system for downsizing an input disjoint block level encoded image 100. The system 100 can be configured to receive an input disjoint block level encoded image from a local or remote resource. The input disjoint block level encoded image can include or can be associated with a respective set of DCT coefficients. The DCT coefficients can be the ones that were used to compress or otherwise encode a precursor image to create the input image. By way of example, the precursor image can be a RAW image that was encoded or an encoded image that was recompressed or re-encoded. The input image can be, for example, a JPEG image, and the JPEG image file can include data representing the respective set of DCT coefficients that resulted from the JPEG encoding process.

According to examples of the presently disclosed subject matter, the system for downsizing an input disjoint block level encoded image 100 can include a system processor 20, a DCT domain processor 30 and a pixel domain processor 40.

According to examples of the presently disclosed subject matter, the DCT domain processor 30 can be configured to receive as input a disjoint block level encoded image, or at least data corresponding to such a disjoint block level encoded image. Further by way of example, the DCT domain processor 30 can be adapted to calculate a DCT domain target downsize ratio for a disjoint block level encoded image.

According to examples of the presently disclosed subject matter, the DCT domain processor 30 can be adapted to configure a DCT domain downsize operation using the DCT domain target downsize ratio. Further by way of example, the DCT domain processor 30 can perform the DCT domain downsize operation to reduce the spatial resolution of the input image according to the calculated DCT domain target downsize ratio. Still further by way of example, the DCT domain downsize operation can be carried out on the block DCT coefficients associated with the input image.

According to examples of the presently disclosed subject matter, the pixel domain processor 40 can also be configured to receive as input a disjoint block level encoded image after decoding to the pixel domain, or at least data corresponding to such a disjoint block level encoded image. The image that is fed to the pixel domain processor 40 can be an intermediate image which is a result of the DCT domain processing carried out by the DCT domain processor 30.

According to examples of the presently disclosed subject matter, the pixel domain processor 40 can be configured to calculate a pixel domain downsize ratio. In one example, the pixel domain downsize ratio can be used by the pixel domain processor 40 to configure a pixel domain downsize operation. Further by way of example, the pixel domain processor 40 can perform the pixel domain downsize operation to reduce the spatial resolution of the intermediate image according to the calculated pixel domain target downsize ratio. Still further by way of example, the pixel domain downsize operation can be carried out directly on pixel values of the intermediate image.

It would be appreciated that the system 100 can reduce the input image by a certain factor by applying a DCT domain downsize operation, and can further reduce an intermediate image that results from the DCT domain downsize operation by applying a pixel domain downsize operation over the intermediate image. According to examples of the presently disclosed subject matter, the system 100 can be configured such that the combination of the downsize operations (in the DCT domain and in the pixel domain) can enable a downsizing of the input image to an arbitrary dimension (or by an arbitrary downsize ratio). According to examples of the presently disclosed subject matter, the system 100 can be configured to combine the DCT domain downsize and the pixel domain downsize operations to provide a downsizing process that can be, as a whole, relatively low cost (in terms of runtime or computing resources) on the one hand, and that can provide a relatively high quality downsized output image on the other hand. As an example, quality of the downsized output images can be measured by a subjective similarity measure, such as Mean Opinion Scoring ("MOS").

According to examples of the presently disclosed subject matter, the system controller 20 can include a processor (e.g., a CPU) 22 and a memory module 24 that are operable for processing instructions for operating and controlling the system 100 and/or any component of the system. The system controller 20 can also include or otherwise be associated with a general purpose or a dedicated storage medium 26 that is used to store system settings and definition for the processes implemented by the system 100. The data stored in the storage medium 26 can be used by the system controller 20 to control the operation of the system 100 and/or the operation of any of the system's components. The storage medium 26 can also be used to store data that is generated during or as a result of the processes carried out by the system 100. Some or all of the system components can include a microcontroller (e.g., microcontrollers 38 and 48) that is responsible for some or all of the operations carried out by the respective component of the system. In some cases, or in connection with some operations, a microcontroller of a certain component of the system 100 can operate in conjunction with the system controller 20 and/or in cooperation with a microcontroller of another component or components of the system 100.

According to examples of the presently disclosed subject matter, the system 100 can include an input interface 10 that can be used for facilitating receipt of an input image from an external source. The system 100 can also include an output interface 50 that is configured to provide as output a downsized image that corresponds to the input image.

Figure 2:
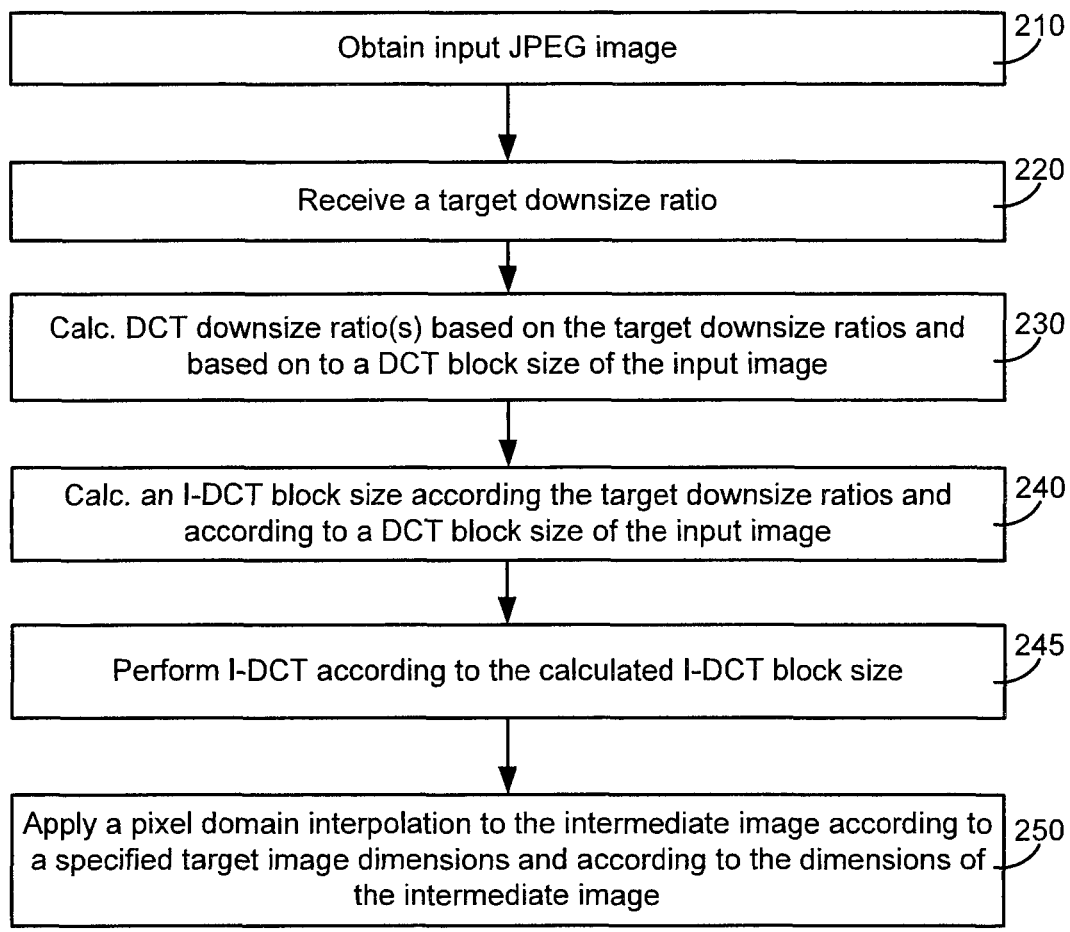
FIG. 2 is a flow chart illustration of a method of downsizing an input disjoint block level encoded image, according to examples of the presently disclosed subject matter.

Reference is now additionally made to FIG. 2, which is a flow chart illustration of a method of downsizing an input disjoint block level encoded image, according to examples of the presently disclosed subject matter. For convenience, some of the herein discussions are made with reference to a JPEG input image. It would be appreciated that examples of the presently disclosed subject matter can apply mutatis-mutandis to other types of disjoint block level encoded images, and the reference made to JPEG images is non-limiting. According to examples of the presently disclosed subject matter, a JPEG input image can be obtained (block 210), for example the input image can be fed to the system 100 through the input interface 10.

According to examples of the presently disclosed subject matter, the input image can be fed, by instruction of the system controller 20, to the DCT domain processor 30. According to examples of the presently disclosed subject matter, the DCT processor 30 can include a DCT domain controller 32. The DCT domain controller 32 can be configured to control the operation of the components of the DCT processor 30.

According examples of the presently disclosed subject matter, in addition to the input image, the system 100 can receive as input a target downsize ratio or target image dimensions (block 220). A target downsize ratio can be a figure which specifies an extent of downsize that the system 100 is requested to provide with respect to the input image. The downsize ratio can denote a desired ratio between the input image and the output downsized image. It would be appreciated that the desired downsize can be specified in other forms and the examples of the presently disclosed subject matter can be adapted accordingly for other forms.

The target downsize ratio can relate to each dimension (horizontal and vertical) of the image. In case target image dimensions are provided with the input image, a DCT downsize ratio can be calculated for each dimension (horizontal and vertical) according to the respective input and target image dimensions. The source of the target downsize ratio can be an operator of the system, or some other computerized source, e.g., a web application, a storage system controller, etc.

According to examples of the presently disclosed subject matter, the target downsize ratio can be an arbitrary figure representing an arbitrary downsize ratio. Further by way of example, the target downsize ratio in at least one dimension of the image can be such that the quotient of the DCT transform length (the numerator) and the target downsize ratio (the denominator) is not an integer number. It would be appreciated, that for a target downsize ratio that does not yield an integer quotient, complex processing may be required for DCT domain downsizing using the DCT coefficients corresponding to the input image. This does not include the case where the target downsize ratio corresponds to a combination of two (or three, etc.) target downsize ratios that are each an aliquot divisor of the DCT transform length (i.e., it divides the DCT transform length without remainder).

According to examples of the presently disclosed subject matter, the proposed system for downsizing an input disjoint block level encoded image 100 can be configured to implement a downsizing process that includes a combination of DCT domain and pixel domain downsizing for downsizing input images according to a target downsize ratio that does not yield an integer quotient when dividing the DCT transform length.

As mentioned above, instead of a target downsize ratio, target image dimensions can be provided. The target image dimensions can be any (reduced) arbitrary dimensions selected by an operator of the system, or by an external digital data system. Target downsize ratios and target image dimensions are used interchangeably in the description of examples of the presently disclosed subject matter.

According to examples of the presently disclosed subject matter, the DCT domain processor 30 can include a DCT downsize configurator 34. The DCT downsize configurator 34 can be configured to calculate DCT domain downsize ratios according to the target downsize ratios (or according to the target image dimensions) and according to the DCT transform length associated with the input image (block 230). According to examples of the presently disclosed subject matter the computation of the DCT downsize ratios is configured to provide for at least one of the axes of the image, an aliquot divisor of the DCT transform length (i.e., it divides the DCT transform length without remainder) that is to be used as the DCT downsize ratio for the respective axis of the image. Further according to examples of the presently disclosed subject matter, the DCT downsize ratios are either both an aliquot divisor of the DCT transform length, or the DCT downsize ratio for a first axis is an aliquot divisor of the DCT transform length, and for the second axis the DCT downsize ratio is 1 (i.e., no DCT downsizing is to be applied over the second axis).

For example, for a JPEG image having a DCT transform length of 8×8, the DCT downsize ratio can be any one of: 8/a where $1 \le a \le 7$, and in case for a first one of the axes, the DCT downsize ratio is equal to or larger than 8/7, the DCT downsize ratio for the second axis can be any one of 8/a where $1 \le a \le 8$ (i.e., it is possible that no downsizing in the DCT domain is applied to the second axis). In case the DCT downsizing process implemented with respect to the JPEG input image is implemented as a multi-iteration process, the DCT downsize ratio can be likewise computed at each iteration of the DCT downsize process.

According to examples of the presently disclosed subject matter, the computation of the DCT downsize ratio can also take into account the effect of other processes which can reduce the spatial resolution of the input image. For example, when the downsizing process is implemented together with other image processing procedures which can reduce the spatial resolution of the input image. It would be appreciated that if such processes are not taken into account, the output image can have different dimensions than those specified by the target image dimensions or by the target downsize ratio. Further by way of example, if such other process affect only a certain component of the image (e.g., downsizing of the Chroma plane but not the Luma component), the DCT domain downsizing ratio can be accordingly adjusted only for the affected component.

According to other examples of the presently disclosed subject matter, for some images, the DCT domain processor 30, possibly in cooperation with the DCT downsize configurator 34, can be configured to maintain the same number of pixels as in the input image (i.e., the DCT downsize factor for both axis is 1 or 8/8), and DCT domain processing can involve in such circumstances DCT AAF processing only. Still by way of example of the presently disclosed subject matter, DCT AAF processing can be implemented as part of the DCT domain processing. By way of example of the presently disclosed subject matter, DCT AAF processing can be implemented as part of the main DCT downsizing process, or the DCT AAF can be implemented after the main DCT downsizing process is complete. DCT AAF processing is further described below.

According to some examples of the presently disclosed subject matter, the DCT downsize configurator 34 can be configured to implement the DCT domain downsizing process as a multi-iteration process, and each time (or for each iteration of the process), the DCT downsize configurator 34 can compute respective DCT downsize ratios in a manner to provide for at least one of the axes of the image, an aliquot divisor of the DCT transform length (i.e., it divides the DCT transform length without remainder) that is to be used as the DCT downsize ratio for the respective axis of the image.

According to examples of the presently disclosed subject matter, the DCT downsize configurator 34 can be configured to implement an iterative DCT domain downsizing process when, for at least one of the axes, the target downsize ratio corresponds to a DCT downsize ratio that is larger than 4. According to further examples of the presently disclosed subject matter, the DCT domain processor 30, possibly in cooperation with the DCT downsize configurator 34, can be configured implement an iterative DCT domain downsizing process that include as many iterations as possible of DCT domain downsizing of at least one of the axes by a DCT downsize ratio equal to 2. Thus, for example, in case the DCT domain downsize ratio is 8 for each of the two axes, instead of performing one iteration of a DCT domain downsizing process whereby the input image is downsized by a ratio of 8, three iterations of a DCT domain downsizing process are implemented, and at each iteration the image is downsized by a ratio of 2, for a total DCT domain downsize ratio of 8. For convenience, the later configuration of the proposed DCT domain downsizing is sometimes referred to herein as a DCTx2 configuration, and the former configuration is referred to as a DCToctv configuration. It would be appreciated, that the DCTx2 configuration is only relevant for cases where the DCT downsize ratio is equal to or higher than 2.

It would also be appreciated, that under certain circumstances, the DCTx2 configuration can yield a better quality intermediate image (the image that is the result of the DCT domain processing), at an increased cost (in terms of resource and/or runtime) compared to a corresponding downsizing operation using the DCToctv configuration.

According to examples of the presently disclosed subject matter, the DCT domain processor 30 can include a DCT domain AAF 39. The DCT domain AAF 39 can be configured to apply a DCT domain anti-aliasing filter. Further by way of example, the DCT domain AAF be implemented as a part of the DCT domain processing, before the I-DCT downsizing block is executed, or in other examples of the presently disclosed subject matter, the DCT domain AAF can be implemented after the DCT-domain downsizing process, as will be described below. Further by way of example, the DCT domain controller 32 can select among the different DCT domain AAF (pre)configurations, and can choose to implement the DCT AAF either as a part of the DCT domain processing, before the I-DCT downsizing block is executed, or after the DCT-domain downsizing process is complete. For example, the DCT domain controller 32 can select the DCT domain AAF configuration according to characteristics of the input image, according to the target downsize ratio, according to the DCT domain downsize ratios, according to the DCT transform length associated with the input image, according to external input on the importance of aliasing for a particular system or for a specific image, or according to any combination thereof, and a different AAF configuration may be selected for different image planes. The various implementations of the DCT domain AAF are further discussed below.

According to examples of the presently disclosed subject matter, the DCT domain processor can include an I-DCT engine 35. The DCT downsize configurator 34 can be adapted to configure I-DCT engine 35 according to the calculated DCT domain downsize ratios. For example, The DCT downsize configurator 34 can be adapted to configure I-DCT engine 35 to use an I-DCT block size that corresponds to the target downsize ratios and to a DCT block size of the input image (block 240). The I-DCT engine 35 can be configured to perform an inverse DCT ("I-DCT") operation according to the selected or computed I-DCT block size configuration (block 245). It would be appreciated that since the DCT downsize ratio(s) is an aliquot divisor of the DCT transform length (i.e., it divides the DCT transform length without remainder), the I-DCT engine 35 can be configured to use directly the DCT coefficients corresponding to the input image. Further by way of example, the I-DCT engine 35 can be configured to apply an I-DCT using a subset of the DCT coefficients corresponding to the input image. In case according to examples of the presently disclosed subject matter, a multi-iteration DCT downsize process is implemented (including DCTx2), at each iteration of the process, the I-DCT engine 35 can be configured to use a subset of the set of DCT which corresponds to the input image or the set of DCT coefficients that corresponds to the downsized image resulting from the previous iteration of the DCT downsize process. As mentioned above, a DCT AAF can be implemented after the completion of the DCT downsizing process. According to examples of the presently disclosed subject matter, in case a multi-iteration DCT downsize process is implemented (including DCTx2), the DCT AAF can be implemented before the I-DCT operation in the final iteration of the multi-iteration DCT downsizing process is performed.

The output of the I-DCT engine 35 is a pixel image. It would be appreciated that in addition to the I-DCT other processing steps may be required and can be implemented by the DCT domain processor 30 in order to generate the pixel image. Such processing steps would be familiar to those versed in the art.

The system controller 20 can obtain the intermediate image generated by the DCT domain processor 30 and can input the intermediate image to the pixel domain processor 40. For convenience, the image or the data representing an image that is generated by the DCT domain processor 30 is referred to herein as "the intermediate image". According to examples of the presently disclosed subject matter, the DCT downsize ratio that was used in the DCT domain downsizing process represents partial downsizing compared to the target downsize ratios, and the system 100 can be configured to further reduce the intermediate image by applying pixel domain downsizing to the intermediate image. Thus, according to examples of the presently disclosed subject matter, in the pixel domain processor 40, a pixel domain interpolation can be applied to the intermediate image according to the dimensions of the intermediate image and according to the target image dimensions (block 250).

According to examples of the presently disclosed subject matter, the pixel domain processor 40 can include a pixel domain controller 41. The pixel domain controller 41 can be configured to control the operations of the components of the pixel domain processor 40. Still further by way of example, the pixel domain processor 40 can also include a pixel domain downsize configurator and a pixel domain interpolator. In FIG. 1, by way of example, the pixel domain processor 40 includes a Luminance ("Luma") downsize module 42 and a Chrominance ("Chroma") downsize module 45, and the pixel domain downsize configurator 43 and 46 and the pixel domain interpolator 44 and 47 are implemented within the Luma and Chroma downsize modules.

By way of example, the pixel domain controller 41 can be configured to calculate a pixel domain downsize ratio according to which the intermediate image is further downsized in the pixel domain. The pixel domain downsize ratio can be based on the target image dimensions and on the dimensions of the intermediate image. Further by way of example, pixel domain downsize ratio can be equal to approximately a ratio between the intermediate image dimensions and the target image dimensions. It would be appreciated that according to examples of the presently disclosed subject matter, the pixel domain processing can be configured to downsize the intermediate image to approximately the target image dimensions. According to examples of the presently disclosed subject matter, the computation of the pixel domain downsize ratio can also take into account the effect of other processes which can reduce the spatial resolution of the input image. For example, when the downsizing process is implemented together with other image processing procedures which can reduce the spatial resolution of the input image. It would be appreciated that if such processes are not taken into account, the output image can have different dimensions than those specified by the target image dimensions or by the target downsize ratio. Further by way of example, if such other process effect only a certain component of the image (e.g., downsizing of the Chroma plane but not the Luma component), the pixel domain downsizing ratio can be accordingly adjusted only for the affected component.

According to examples of the presently disclosed subject matter, the pixel domain processor 40 can be configured to select the pixel domain downsize algorithm from a predefined set of pixel domain downsize algorithm (e.g., bilinear interpolation, bi-cubic interpolation, fixed support Lanczos with 2 or 3 side lobes, adaptive support Lanczos with 2 or 3 side lobes, IPP super-sampling approach or any other interpolation scheme). Further by way of example, the pixel domain processor 40 can be configured to select the pixel domain downsize algorithm that is to be used according to the original downsize ratio, the remaining pixel domain downsize ratio, image characteristics such as image resolution, or an application based configuration. In other examples of the presently disclosed subject matter, the pixel domain algorithm(s) used in the pixel domain downsizing process is/are predefined and is/are used according to predefined definitions.

According to examples of the presently disclosed subject matter, the pixel domain processor 40 can implement a different pixel domain downsizing process for each of the Luma component and the Chroma components of the intermediate image. Still further according to examples of the presently disclosed subject matter, the pixel domain interpolation process can be configured separately and possibly differently for each of the Luma (Y) component and the Chroma (U and V) components of the intermediate image by the respective pixel downsize modules 42 and 45. Further according to examples of the presently disclosed subject matter, the pixel domain processor 40 can be adapted to configure and apply a different pixel domain downsizing algorithm for downsizing, in the pixel domain, each of the Luma (Y) component and the Chroma (U and V) components of the intermediate image.

It would be appreciated by those versed in the art, that in general terms, as the downsize ratio decreases, pixel domain downsizing algorithms can provide relatively better results at low computational complexity. Thus, it would be appreciated that in accordance with examples of the presently disclosed subject matter, a good tradeoff between quality and cost can be obtained by applying the DCT domain downsizing to provide a partial yet relatively high quality and low cost downsizing in the DCT domain, and using the pixel domain only for downsizing the intermediate image to the target image dimensions.

According to examples of the presently disclosed subject matter, the pixel domain processor 40 can provide data corresponding to a pixel image, which is a downsized version of the input image. The output of the pixel domain processor 40 is a pixel domain image, and the system processor 20 can the pixel image from the pixel domain processor 40 as output. The pixel domain image can be fed to an encoder for further processing, such as a JPEG encoder for example.

Figure 3:
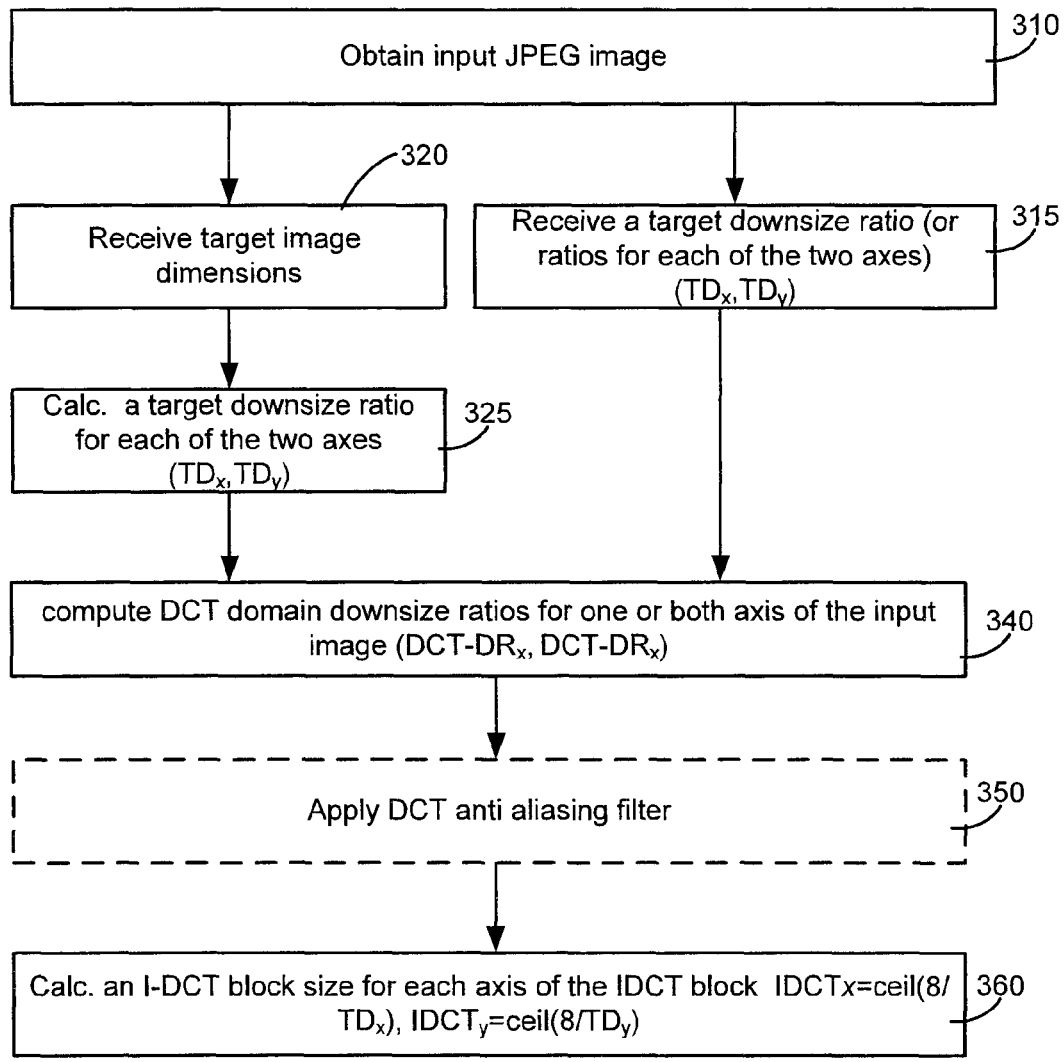
FIG. 3 is a flow chart illustration of an example of a DCT domain downsize process that can be implemented as part of an image downsize process, according to examples of the presently disclosed subject matter.

Reference is now made to FIG. 3, which is a flow chart illustration of an example of a DCT domain downsize process that can be implemented as part of an image downsize process, according to examples of the presently disclosed subject matter. According to examples of the presently disclosed subject matter, a JPEG input image can be obtained (block 310) and can be fed to the DCT domain processor 30. A target downsize ratio can accompany the input image (block 315). According to examples of the presently disclosed subject matter, the target downsize ratio can relate to each of the two axes of the image. The target downsize ratios can indicate a total extent of desired downsizing that is to be applied to each of the respective axes of the input image. For convenience, the target downsize ratio for the horizontal axis (x) is denoted by $TD_x$ and the target downsize ratio for the vertical axis (y) is denoted by $TD_y$.

As mentioned above, instead of target downsize ratios, the extent of downsizing that is to be applied to the input image can be specified in the form of target image dimensions, which can be fed to the system 100 in association with the input image (block 320). In case target image dimensions are used to indicate the extent of downsizing that is to be applied to the input image, the DCT domain processor 30 (e.g., the DCT domain controller 32 or the DCT downsize configurator 34) can be configured to calculate the target image downsizing factors ($TD_x$ and $TD_y$) based on the dimensions of the input image and based on the target image dimensions (block 325).

The DCT domain downsizing processor 30 (e.g., using the DCT downsize configurator 34) can proceed with a computation of the DCT domain downsize ratios for one or both axis of the input image (block 340). As mentioned above, according to examples of the presently disclosed subject matter, the DCT downsize ratio(s) for at least one of the axes of the image, is an aliquot divisor of the DCT transform length (i.e., it divides the DCT transform length without remainder). For convenience, the DCT domain downsize ratio for the horizontal axis (x) is denoted by $DCT\text{-}DR_x$ and the DCT domain downsize ratio for the vertical axis (y) is denoted by $DCT\text{-}DR_y$. Each of the DCT domain downsize ratios is equal to a respective quotient of the DCT transform length associated with the input image and a higher integer bound (a ceiling expression) of a ratio among the DCT transform length and the respective target downsize ratio.

For example, in case the input image is a JPEG image that was encoded using an 8×8 DCT transform block, the following formula can be used for calculating the DCT domain downsize ratios:

$$DCT-DR_x = \frac{8}{\operatorname{ceil}(8/TD_x)} \qquad \text{Formula 1}$$

$$DCT-DR_y = \frac{8}{\operatorname{ceil}(8/TD_y)}$$

According to examples of the presently disclosed subject matter, as part of the DCT domain downsizing process, and in addition or an as alternative to the DCT downsize ratio(s), I-DCT dimensions can be calculated for each axis (block 350). The I-DCT dimensions can represent a desired downsizing of the input image in at least one dimension of the image. According to examples of the presently disclosed subject matter, as part of the DCT downsizing process, in at least one dimension, the I-DCT block size is smaller than the DCT block size corresponding to the input image. For convenience, the I-DCT block dimension for the horizontal axis (x) is denoted by $I\text{-}DCT_x$ and the I-DCT block dimension for the vertical axis (y) is denoted by $I\text{-}DCT_y$. Each of the I-DCT block dimensions is equal to a respective higher integer bound of a ratio among the DCT transform length and the respective target downsize ratio.

For example, in case the input image is a JPEG image that was encoded using an 8×8 DCT transform block, the following formula can be used for calculating the I-DCT block dimensions:

$$IDCT_x = \operatorname{ceil}(8/TD_x) \; IDCT_y = \operatorname{ceil}(8/TD_y) \qquad \text{Formula 2}$$

It would be appreciated that various other mathematical formulations can be devised which are equivalent to the above formulae.

According to examples of the presently disclosed subject matter, the computation of the DCT domain downsize ratios can be implemented after the calculation of the I-DCT dimensions and can use the results of the calculation of the I-DCT dimensions for computing the DCT domain downsize ratios.

The I-DCT engine 35 can be configured to compute an I-DCT over the DCT blocks corresponding to the input image according to the calculated I-DCT block dimensions (block 360). The output of the I-DCT engine 35 can be a pixel image. It would be appreciated that in addition to the I-DCT other processing steps may be required and can be implemented by the DCT domain processor 30 in order to generate the pixel image. Such processing steps would be familiar to those versed in the art. According to examples of the presently disclosed subject matter, the image which is obtained from the output of the I-DCT engine 35 can be an intermediate image that is fed to the pixel domain processor 40, for further downsizing in the pixel domain, or according to examples of the presently disclosed subject matter, a further iteration of a multi-iteration DCT domain process can be applied to the output of the I-DCT engine 35, following updating of the target downsize ratio and/or the data relating to the dimensions of the input image.

According to examples of the presently disclosed subject matter, the DCT domain processing can include DCT AAF (block 350). Further by way of example, the DCT domain AAF can be implemented as part of the DCT domain downsizing process before the I-DCT (block 360), or in other examples of the presently disclosed subject matter, the DCT domain AAF can be implemented after the DCT domain downsizing process is complete (and in particular after the I-DCT operation).

According to examples of the presently disclosed subject matter, as part of the configuration of DCT AAF 39, the cut-off frequencies for the DCT AAF can be computed. For example, cut-off frequencies can indicate which of the DCT coefficient that correspond to the input image represent frequencies that are below the filter cut-off frequency. The DCT AAF 39 can be configured to filter DCT coefficients that represent frequencies that are higher than the cut-off frequency. For example, the DCT AAF 39 can be configured to set DCT coefficients that represent frequencies that are higher than the cut-off frequency to zero.

In case the DCT AAF is implemented as part of the DCT domain downsizing process, the DCT AAF is applied to the DCT coefficients which correspond to the input image, or in a multi-iteration DCT domain downsizing process, the DCT AAF is applied as part of the last iteration of the DCT domain downsizing process, and with respect to the DCT coefficients which correspond to the result of the previous iteration of the DCT domain downsizing process.

In case the DCT AAF is implemented after the DCT downsizing is complete, the DCT AAF is applied to the pixel image generated by the I-DCT engine. According to this configuration of the DCT AAF 39, a DCT transform is computed over the output of the DCT domain downsizing process, i.e., the DCT AAF is applied to DCT coefficients computed after the I-DCT which concluded the DCT domain downsizing process, and a further I-DCT is applied to the filtered DCT coefficients. In a multi-iteration DCT domain downsizing process, where the DCT AAF is implemented after the DCT downsizing is complete, a DCT transform is computed over the output of the DCT domain downsizing process, i.e., the DCT AAF is applied to DCT coefficients computed after the I-DCT which concluded the final iteration of the DCT domain downsizing process, and a further I-DCT is applied to the filtered DCT coefficients.

For convenience, the DCT AAF cutoff frequency for the horizontal axis (x) is denoted by $CO_x$ and the DCT AAF cutoff frequency for the vertical axis (y) is denoted by $CO_y$. According to one example, each of the DCT AAF cutoff frequencies is equal to a lower integer bound of a ratio among the DCT transform length and the respective target downsize ratio. According to another example, a filter offset is added to the quotient of the DCT transform length and the respective target downsize ratio and lower integer bound is computed over the sum of the filter offset and the quotient of the DCT transform length and the respective target downsize ratio.

For example, in case the input image is a JPEG image that was encoded using an 8×8 DCT transform block, the following formula can be used for calculating the cutoff frequencies:

$$CO_x = \text{floor}[(8/TD_x) + \text{filtOffset}] \quad CO_y = \text{floor}[(8/TD_y) + \text{filtOffset}] \quad \text{Formula 3}$$

Here, by way of example, $CO_x$ and $CO_x$ defines a rectangle which represents the DCT coefficients that would be kept, and the DCT coefficients outside the ($CO_x$, $CO_y$) rectangle shall be set to zero. filtOffset represents a small value (for example, less than 0.25) which can be optionally used to increase the cutoff frequency and to allow the DCT AAF to keep an additional frequency range when the quotient of the DCT transform length and the respective target downsize ratio (without the filtOffset) is nearly high enough for the AAF DCT to keep the additional frequency range. It would be appreciated that when the quotient of the DCT transform length and the respective target downsize ratio (without the filtOffset) is nearly high enough for the AAF DCT to keep the additional frequency range, maintaining the additional frequency range would likely not add significant aliasing artifacts in the output image.

There is now provided a non-limiting numerical example of DCT processing, including a DCT AAF operation, implemented according to examples of the presently disclosed subject matter.

Assume that the DCT domain processor is provided with an input JPEG image and the target downsize ratio provided with the input JPEG image is 1.5, in both axes. The DCT downsize ratio in both axes can be approximately 1.333 or 8/6 (see formula 1) and the pixel domain downsize ratio can be set to 1.125, in both axes.

Now, assume that the AAF DCT is applied after the DCT domain downsizing process is complete. Accordingly, the input image was downsized in the DCT domain. Thus, the output of the I-DCT represents an image which is has 75% of the pixels in the input image. A DCT transform can be applied to the output of the DCT domain downsizing process, and the DCT AAF can be applied to the DCT coefficients correspond to the output of the DCT domain downsizing process. In the current example, the cutoff frequency for the DCT AAF is equal to 7 (see formula 3), and thus only the eighth DCT coefficient is set to zero as a result of the DCT AAF. After the DCT AAF is complete, an I-DCT operation can be implemented, and the resulting image can be provided as output of the DCT domain processor 30.

It would be appreciated that in this configuration, where the AAF DCT is applied after the DCT domain downsizing process is complete, the step-size between consecutive filter cutoff frequencies corresponds to an eighth of the reduced dimensionality, after the initial DCT domain downsizing by a ratio of 1.333. In this example, the obtained filter cutoff frequency is 7/8 or 0.875.

Now, assuming that the AAF DCT is applied before the DCT domain downsizing process is implemented. The cutoff frequency for the DCT AAF would be 5 (see formula 3). Accordingly, the three DCT coefficients beyond the fifth are set to zero. The AAF filtered image is fed to the DCT domain downsizing process, where a 6×6 I-DCT may be implemented. In this example, the obtained filter cutoff frequency is 5/8×8/6 or 0.833.

It would be appreciated that the configuration of the DCT AAF in the first example above involves an additional I-DCT and DCT computation compared to the configuration of the DCT AAF in the second example, and thus the configuration of the DCT AAF in the second example can generally yield better computational performance compared to the configuration in the second example. It would also be appreciated that on the other hand, the configuration of the DCT AAF in the first example above allows a smaller step size between consecutive filter cutoff frequencies, and in general can provide a more accurate filter cutoff frequency selection. It would be also appreciated that the possibility of a more accurate filter cutoff frequency selection, can allow, in general, maintaining more of the valid frequency range (which is not expected to introduce aliasing artifacts).

Figure 4:
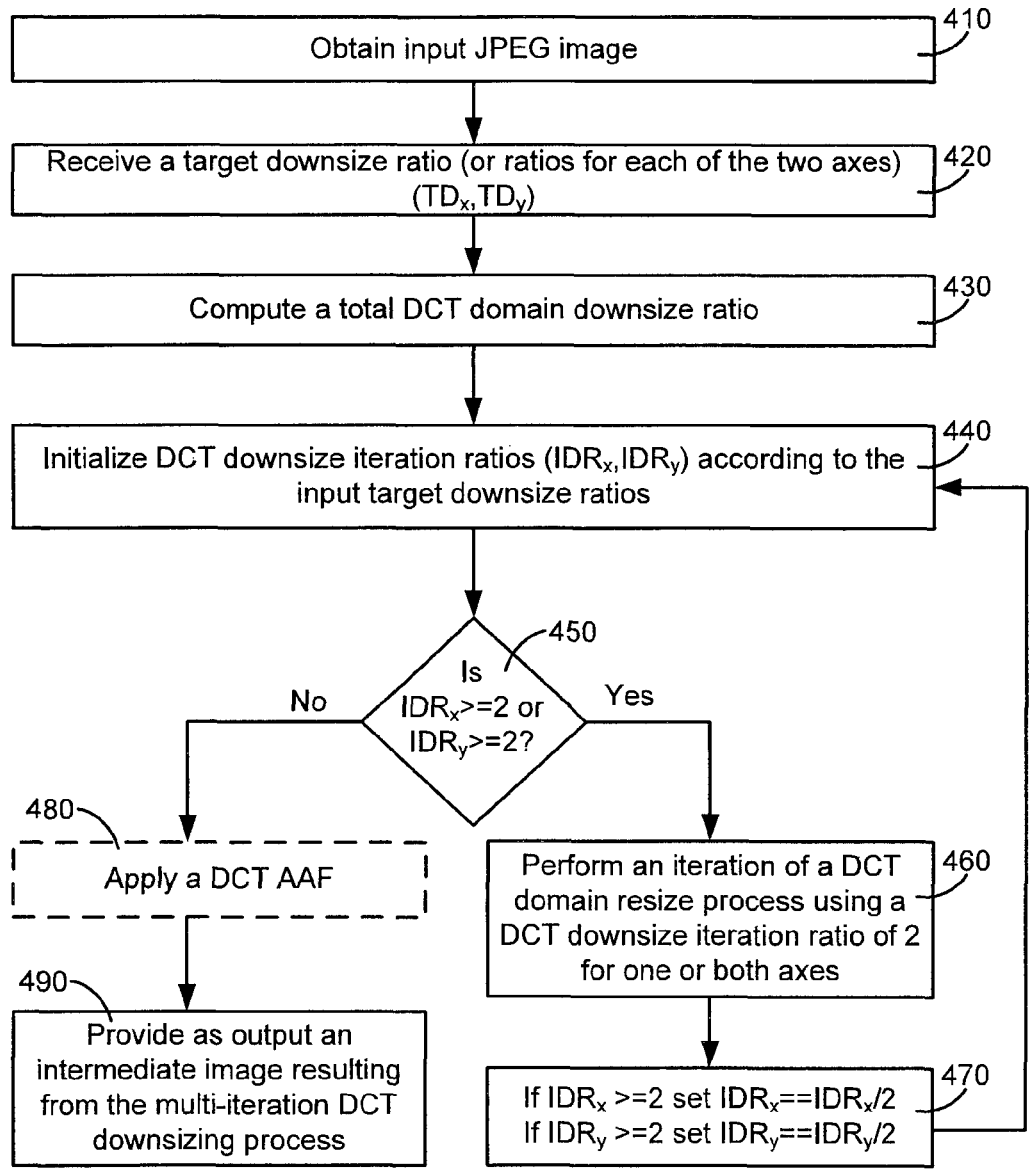
FIG. 4 is a flow chart illustration of an example of a DCT domain downsize process implemented according to a DCTx2 configuration as part of an image downsize process, according to examples of the presently disclosed subject matter.

Reference is now made to FIG. 4, which is a flow chart illustration of an example of a DCT domain downsize process implemented according to a DCTx2 configuration as part of an image downsize process, according to examples of the presently disclosed subject matter. Initially, a JPEG input image can be obtained (block 410). The target downsize ratios ($TD_x$ and $TD_y$) can be obtained (block 420).

According to some examples of the presently disclosed subject matter, based on the target downsize ratios, and based on the DCT transform length associated with the input image, a total DCT domain downsize ratio can be computed (block 430). In examples of the presently disclosed subject matter, the multi-iterative DCTx2 configuration is applicable when the target downsize ratio is at least 4.

According to examples of the presently disclosed subject matter, since the system is operating in a DCTx2 configuration, the DCT domain downsizing process can be carried out in multiple iterations. Further by way of example, DCT downsize iteration ratios can be used to indicate the extent of further downsizing that is required in order to reach the target downsize ratios. For the first iteration of the DCT downsizing process the DCT downsize iteration ratios can be equal to the total DCT domain downsize ratio (block 440). For convenience, the DCT downsize iteration ratio for the horizontal axis (x) is denoted by $IDR_x$ and the DCT domain downsize iteration ratio for the vertical axis (y) is denoted by $IDR_y$.

Optionally, according to examples of the presently disclosed subject matter, when the system is operating according to DCTx2 configuration, the DCT domain processor can be configured to adjust the total DCT domain downsize ratio to the nearest factor of 2. Accordingly, by way of example, the total DCT domain downsize ratio can be computed as a nearest factor of 2 from below of a quotient of the DCT transform length associated with the input image and a higher integer bound of a ratio among the DCT transform length and the respective target downsize ratio.

According to examples of the presently disclosed subject matter, since the system is operating in a DCTx2 configuration, an iteration control statement can be provided to control the iterative DCT domain downsizing process. For example, before each iteration of the DCT domain downsizing process, the current DCT downsize iteration ratios are evaluated (block 450) to determine whether to initiate a further iteration of the DCT domain downsizing process, or whether to conclude it. For example, the iteration control statement can be configured to determine whether at least one of the current DCT downsize iteration ratios is equal to or larger than 2. In other words, the iteration control statement can be configured to determine whether the extent of further downsizing in the DCT domain that is required in order to reach the total DCT domain downsize ratio is at least 2.

According to examples of the presently disclosed subject matter, when the DCT domain processor is operating in the DCTx2 configuration, in case it is determined that a further iteration of the DCT domain downsizing process (e.g., at least one of the current DCT downsize iteration ratios is equal to 2 or above), a DCT domain downsizing process can be implemented according to a downsizing ratio of 2 (block 460). Examples of a DCT domain downsizing process according to the presently disclosed subject matter were provided above, and the DCT domain downsizing process can be implemented according to the examples provided above.

Further according to examples of the presently disclosed subject matter, the DCT downsize iteration ratio is updated by dividing each DCT downsize iteration ratio for which a downsizing was performed by a factor of 2 (block 470). It would be appreciated that by updating the DCT downsize iteration ratio(s), the downsizing operation by a ratio of 2 which was performed in the present iteration of the DCT downsizing process is reflected. Subsequent to block 470 the DCT domain downsizing process returns to block 450 to determine, based on the updated DCT downsize iteration ratios whether an addition iteration of the DCT domain downsizing process if required or not.

According to examples of the presently disclosed subject matter, if the DCT downsize iteration ratio for one of the axes is lower than 2, according to the DCTx2 configuration, the DCT downsizing process can be skipped for the respective axis. The DCT downsizing process can be skipped even if the DCT downsize iteration ratio is an aliquot divisor of the DCT transform length (but is less than 2). Further by way of example, if a DCT downsize iteration ratio is above 2 for one of the axis or both of the axis, according to the DCTx2 configuration, the DCT domain processor can be configured to use a downsizing ratio of 2, even if the DCT downsize iteration ratio is higher than 2. Further by way of example, according to the DCTx2 configuration, the DCT domain processor can be configured to carry out as many iterations of a DCT domain downsizing process as possible, whereby at least one of the axes is downsized by a DCT downsize iteration ratio equal to 2.

Thus for example, if a target downsize ratio for a certain JPEG input image is 8.5, and the DCT domain processor is operating in a DCTx2 configuration, three iterations of the DCT domain downsizing process can be implemented, and at each iteration a DCT downsize iteration ratio that is equal to 2 can be used, to yield a total DCT downsizing ratio that is equal to 8. Additional downsizing can be applied in the pixel domain to meet the desired target downsize ratio.

According to examples of the presently disclosed subject matter, since an I-DCT (with a reduced block size) can be implemented as part of each iteration of the DCT domain downsizing process, in case a further iteration is required, the image generated in the previous iteration of the DCT domain downsizing process can undergo a DCT transformation. It would be appreciated that in examples of the presently disclosed subject matter, the DCT transformation can be implemented as a preparation operation for the next iteration of the DCT downsizing process. It would be further appreciated that for JPEG images the DCT block size for the preparatory DCT is 8×8 and not the reduced block size that was used for the previous I-DCT.

Further according to examples of the presently disclosed subject matter, in case a DCT AAF is implemented by the DCT domain processor as part of the DCT domain processing, and in case the DCT AAF is implemented as a preliminary operation before the main DCT downsizing process is carried out, the DCT AAF can be implemented before the last iteration of the DCT domain downsizing process. Further by way of example, the DCT AAF can be applied to the DCT coefficients generated by the preparatory the DCT mentioned above.

According to examples of the presently disclosed subject matter, if at block 450 the evaluation of the iteration control statement indicates that the DCT downsizing process according to the DCTx2 is concluded, the intermediate image resulting from the multi-iteration DCT downsizing process can be provided to the pixel domain processing module to allow further downsizing of the intermediate image in the pixel domain (block 490). If according to the configuration of the DCT domain processor, a DCT AAF should be implemented after the main DCT downsizing process is complete, before the image which results from the multi-iteration DCT downsizing process can be subject to DCT AAF (block 480), as was described above, and the output of the DCT AAF is provided as the output of the DCT domain processor.

According to examples of the presently disclosed subject matter, an image downsizing process is comprised of a DCT domain downsizing process and a pixel domain downsizing process. As part of the image downsizing process, arbitrary target downsizing ratios or arbitrary target image dimension can be provided to specify the extent of downsizing that should be applied to the input image. The input image together with the target downsizing ratios is fed to a DCT domain processor, where the image can undergo DCT domain processing and in particular DCT domain downsizing. According to examples of the presently disclosed subject matter, as was explained above, the intermediate image which is the product of the DCT domain processing may require further downsizing in order to meet the target downsize ratios or the target dimensions. According to examples of the presently disclosed subject matter, the pixel domain downsizing process can be utilized to further reduce the intermediate image using pixel domain interpolation method. The pixel domain downsizing process can be configured to reduce the intermediate image so that the output image, which is the product of the pixel domain processing (following the DCT domain processing), meets the requested target downsizing ratios or the request target image dimensions.

Figure 5:
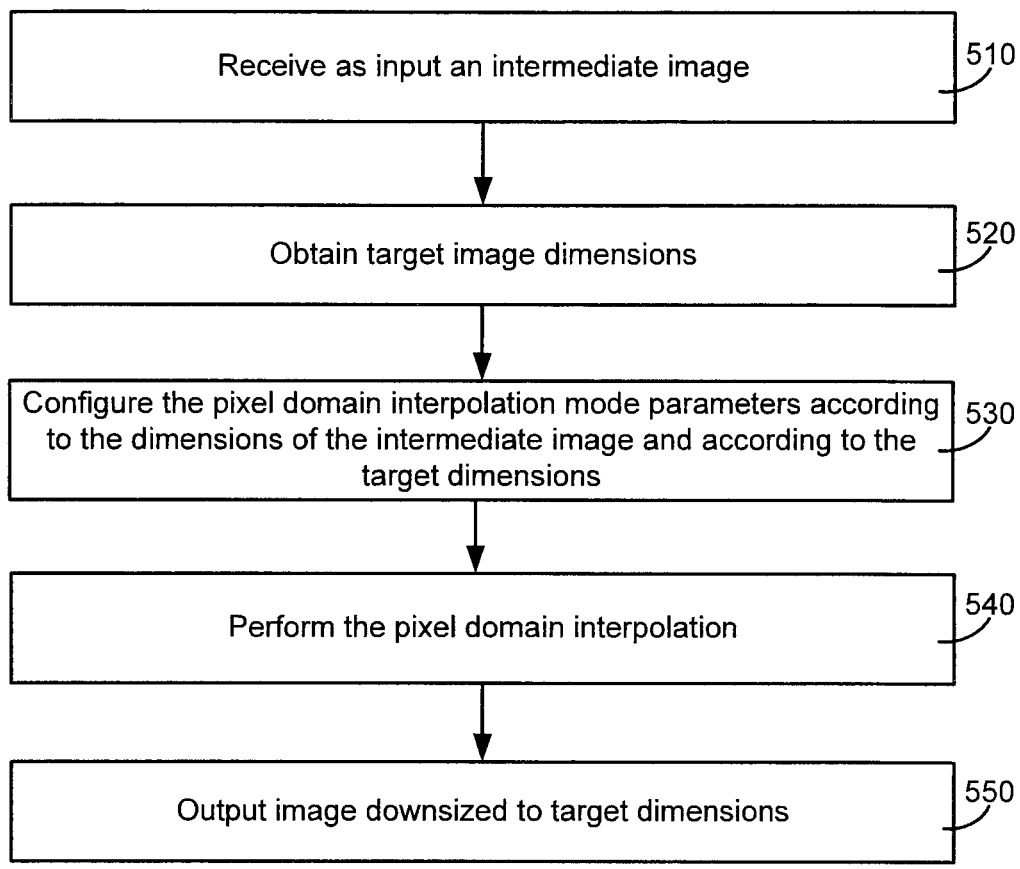
FIG. 5 is a flow chart illustration of an example of a process of determining a pixel domain downsize factor that can be implemented as part of an image downsize process, according to examples of the presently disclosed subject matter.

Reference is now made to FIG. 5 which is a flow chart illustration of an example of a process of determining a pixel domain downsize factor that can be implemented as part of an image downsize process, according to examples of the presently disclosed subject matter. According to examples of the presently disclosed subject matter, the process of determining a pixel domain downsize factor that can be implemented as part of an image downsize process can include obtaining or receiving data with respect to the intermediate image (block 510). The term intermediate image is used to refer to the product of the DCT domain processing, as described above.

In addition to the data with respect to the intermediate image, the target image dimensions can be obtained (block 520). As mentioned above, the target image dimensions can be provided as input or can be computed using the input image dimensions and the target downsize ratios.

According to examples of the presently disclosed subject matter, the pixel domain downsize ratio can be computed based on the dimension of the intermediate image, and based on the target image dimensions (block 530). For example, the pixel downsizing ratio for each one of the image axis can be the quotient of the intermediate image dimensions and the target image dimensions.

According to examples of the presently disclosed subject matter, the pixel domain processor 40 can be configured to calculate a pixel domain downsize ratio. In one example, the pixel domain downsize ratio can be used by the pixel domain processor 40 to configure a pixel domain downsize operation. Further by way of example, the pixel domain processor 40 can perform the pixel domain downsize operation to reduce the spatial resolution of the intermediate image according to the calculated pixel domain target downsize ratio. Still further by way of example, the pixel domain downsize operation can be carried out directly on pixel values of the intermediate image.

Following the computation of the pixel domain downsizing ratio, a pixel domain interpolation process can be configured according to the computed pixel domain downsizing ratio, and the pixel domain interpolation process can be applied to the intermediate image (block 540). The output of the pixel domain interpolation process, which can be an image that is downsized according to the target downsizing ratio (or that is downsized to the target image dimensions), is provided as the output image of the combined DCT domain and pixel domain processes (block 550).

According to examples of the presently disclosed subject matter, the pixel domain processor 40, can be adapted to use different pixel domain algorithms and can be configured to apply different pixel downsizing processes over different components (i.e., the Luma component and the Chroma component) of the intermediate image. It would be appreciated that applying different algorithms to different components of the intermediate image can help reduce computational complexity with a relatively low effect on perceived quality. For example, due to the lower sensitivity of the Human Visual System to the Chroma components (relative to the Luma components) of an image, lower quality algorithms (but also lower complexity) can be used on the Chroma components (relative to the algorithms used for pixel domain downsizing of the Luma components), and while the results can be of lower quality compared to some of the more complex pixel domain downsizing (interpolation) algorithms, the impact on overall perceived quality can be relatively low, and in some examples of the examples of the presently disclosed subject matter, the benefit in terms of computational complexity can be justified.

It would be appreciated that the system 100 can reduce the input image by a certain factor by applying a DCT domain downsize operation, and can further reduce an intermediate image that results from the DCT domain downsize operation by applying a pixel domain downsize operation over the intermediate image. According to examples of the presently disclosed subject matter, the system 100 can be configured such that the combination of the downsize operations (in the DCT domain and in the pixel domain) can enable a downsizing of the input image to an arbitrary dimension (or by an arbitrary downsize ratio).

For example, take a JPEG input image for which the target resize ratio is 1.5. According to examples of the presently disclosed subject matter, the system can utilize the DCT domain processor to downsize the image by (approximately) 1.333, which is the result of a division of 8 (the DCT transform length for the JPEG input image) by a higher integer bound of a ratio among the DCT transform length and the respective target downsize ratio (1.5 in this example). In order to obtain the 1.5 target downsize ratio, the intermediate image generated by the DCT domain processor is fed to the pixel domain processor and additional downsizing by a ratio of 1.125 is performed in the pixel domain. The output image is a JPEG image that was downsized by a ratio of 1.5 relative to the input JPEG image.

According to examples of the presently disclosed subject matter, the pixel domain controller 41 can be configured to use predefined algorithms for downsizing each of the Luma and the Chroma components. According to other example, the pixel domain controller 41 can be configured to select which algorithm to use for downsizing each of the Luma and the Chroma components. For the two Chroma components the same or a different algorithm can be selected.

Figure 6:
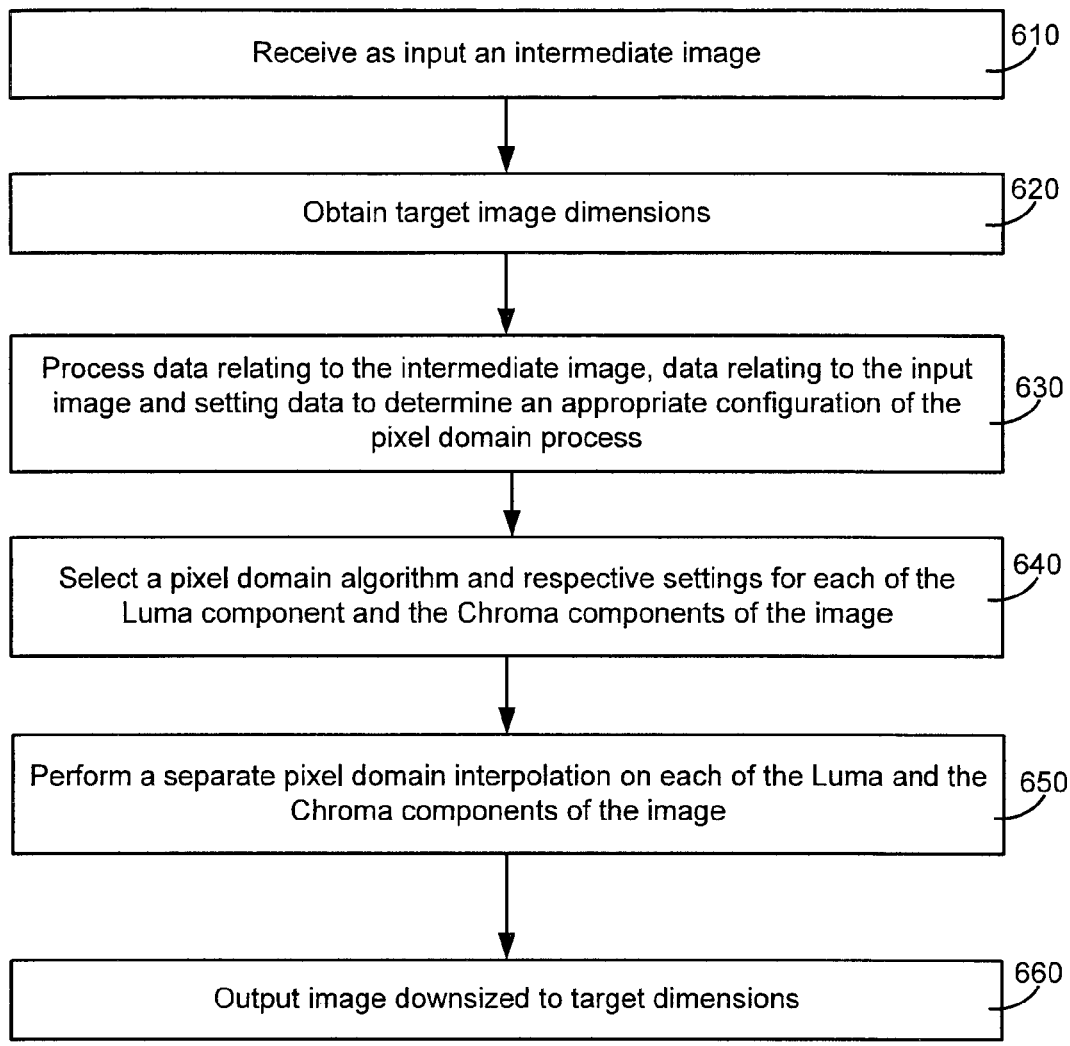
FIG. 6 is a flow chart illustration of an example of pixel domain downsize processing which can be implemented as part of downsizing an input image, and which supports selection of a different pixel domain algorithm for different image components, according to examples of the presently disclosed subject matter.

Reference is now made to FIG. 6, which is a flow chart illustration of an example of pixel domain downsize processing which can be implemented as part of downsizing an input image, and which supports selection of a different pixel domain algorithm for different image components, according to examples of the presently disclosed subject matter. According to examples of the presently disclosed subject matter, a pixel domain processor 40 can receive as input an intermediate image (block 610), e.g., a JPEG image that was downsized by the DCT domain processor 30 and corresponds to an input image that was received at the system 100. The pixel domain processor 40 can also obtain from the input that was received at the system 100 (with or without processing thereof) the target image dimensions (block 620), which are the dimensions to which the image should be downsized.

According to examples of the presently disclosed subject matter, the pixel domain processor 40, e.g., using the pixel domain controller 41, can be configured to process certain data with respect to the input image, with respect to the target dimensions, with respect to the intermediate image, predefined settings, in particular quality setting and/or setting provided with respect to the input image to determine an appropriate configuration of the pixel domain process (block 630). By way of example, the processing carried out by the pixel domain controller for determining a configuration of the pixel domain process that is to be used for downsizing the intermediate image in the pixel domain can include processing of the target image dimensions, the dimensions of the intermediate image and quality setting for each of the Luma component and the Chroma components of the image.

Based on the processing in block 630, or according to predefined settings, the pixel domain controller 41 can be configured to select a pixel domain algorithm and respective settings for each of the Luma component and the Chroma components of the image (block 640). Further by way of example, the pixel domain controller 41 can provide configuration instructions for each the Luma pixel domain downsize module 42 and Chroma pixel domain downsize module 45. Each of the Luma pixel domain downsize module 42 and Chroma pixel domain downsize module 45 can include a respective configurator 43 and 46, respectively, that can be adapted to configure a respective interpolation engine 44 and 47, respectively. The interpolation engines 44 and 47 can be utilized to perform the pixel domain downsizing operations for the Luma component and for the Chroma components, respectively, according to the configurations provide by the respective configurators 43 and 46. As mentioned above, each of the interpolation engines 44 and 47 can use a different pixel domain interpolation algorithm (block 650). The result of the pixel domain downsizing process can be, for example, an image that is a downsized version of the input image, and ratio between the size of the output image and the size of the input image can correspond to the target downsize ratio (block 660).

By way of example, Luma pixel domain downsize module 42 can implement an adaptive support pixel domain interpolation method (e.g., adaptive support Lanczos or super-sampling) for downsizing the Luma component of the intermediate image in the pixel domain, whereas the Chroma pixel domain downsize module 45 can implement a non-adaptive support pixel domain interpolation method (e.g., fixed support Lanczos or bi-linear) for downsizing the Chroma components of the intermediate image in the pixel domain.

In this regard, it would be appreciated that while adaptive support pixel domain interpolation methods are typically capable of providing better quality pixel domain interpolation, compared to non-adaptive support pixel domain interpolation methods, they are also typically more costly (in terms of resources/runtime). Accordingly, it may be advantageous to discriminate between the Luma and Chroma components of the input when performing pixel domain processing, and since the Chroma components are in terms of perceptual quality are commonly less significant, the interpolation method that may be selected for downsizing these component can be one of the less costly non-adaptive support pixel domain interpolation methods, whereas for the more perceptually significant Luma component, one of the adaptive support pixel domain interpolation methods may be preferred.

Unless specifically stated otherwise, as apparent from the following discussions, it is appreciated that throughout the specification discussions various functional terms refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such tangible information storage, transmission or display devices.

It will also be understood that the system according to the invention can be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

It will also be understood that the system according to the invention can be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The invention claimed is:

1. A method of downsizing an input disjoint block level encoded image, comprising:
Calculating, by a Discrete Cosine Transform (DCT) domain processor, a DCT downsize ratio for downsizing the input image in a DCT domain according to a target downsize ratio and according to a size of a DCT transform length associated with the input image;

Adapting, by the DCT domain processor, an I-DCT according to the DCT domain downsize ratios, including configuring a DCT anti-aliasing filter ("AAF") according to the target downsize ratio, and applying the DCT AAF to DCT coefficients corresponding to the input image;
performing, by the DCT domain processor, the adapted I-DCT;
providing, by the DCT domain processor, an intermediate image as output of a DCT domain process; and
applying, by a pixel domain processor, a pixel domain interpolation to the intermediate image according to dimensions of the intermediate image and according to dimensions of the target image.

2. The method according to claim 1, wherein said calculating comprises computing the DCT domain downsize ratio based on a length of the DCT transform and based on the target downsize ratio, for each dimension of the input image.

3. The method according to claim 1, wherein said adapting comprises adapting one or both of a horizontal inverse transform length and a vertical inverse transform length, according to the calculated DCT domain downsize ratio.

4. The method according to claim 1, wherein said adapting comprises reducing one or both of a horizontal inverse transform length and a vertical inverse transform length, according to the calculated DCT domain downsize ratios.

5. The method according to claim 3, further comprising configuring a DCT AAF according to the target downsize ratio, and wherein said adapting further comprises applying the DCT AAF to DCT coefficients corresponding to the input image prior to said performing the adapted I-DCT.

6. The method according to claim 1, further comprising:
after said performing the adapted I-DCT, performing an additional DCT;
configuring a DCT AAF according to the target downsize ratio and according to dimensions of the image after the adapted I-DCT;
applying the DCT AAF to DCT coefficients corresponding to the image after the adapted I-DCT, giving rise to filtered DCT coefficients; and
performing I-DCT over the filtered DCT coefficients giving rise to the intermediate image.

7. The method according to claim 2, wherein said calculating a DCT domain downsize ratio includes:
computing a ceiling expression over a ratio among the DCT transform length associated with the input image and the target downsize ratio, for each dimension of the input image, and
computing a ratio between the DCT transform length associated with the input image and the ceiling expression, for each dimension of the input image.

8. The method according to claim 1, wherein when the target downsize ratio received as input is larger than two implementing a multi-iteration DCT downsizing process comprising:
said calculating a DCT domain downsize ratio comprises setting the DCT domain downsize ratio to two for one or both dimensions of the input image;
said adapting an I-DCT comprises reducing one or both of a horizontal I-DCT transform length and a vertical I-DCT transform length by a factor of two according to the DCT domain downsize ratio;
said performing the adapted I-DCT comprises dividing the target downsize ratio by two for one or both dimensions of the input image; and
repeating said calculating, said adapting and said performing for one or both dimensions of the input image as long as the target downsize ratio following a previous iteration of the process is larger than two for one or both dimensions of the input image, respectively.

9. The method of claim 8, further comprising:
after said performing the adapted I-DCT of a final iteration of said multi-iteration DCT downsizing process, performing an additional DCT;
configuring a DCT AAF according to the target downsize ratio and according to dimensions of the image after the adapted I-DCT of the final iteration of said multi-iteration DCT downsizing process;
applying the DCT AAF to DCT coefficients corresponding to the image after the adapted I-DCT of the final iteration of said multi-iteration DCT downsizing process, giving rise to filtered DCT coefficients; and
performing I-DCT over the filtered DCT coefficients giving rise to the intermediate image.

10. The method according to claim 8, wherein as part of a final iteration of said multi-iteration DCT downsizing process, said adapting further comprises configuring a DCT AAF according to the target downsize ratio, and applying the DCT AAF prior to said performing the adapted I-DCT with respect to DCT coefficients corresponding to a result of a previous iteration of said multi-iteration DCT downsizing process.

11. The method according to claim 1, wherein said applying a pixel domain interpolation to the intermediate image comprises computing a pixel domain downsize ratio according to the dimensions of the intermediate image and the target image dimensions or according to the DCT domain downsize ratio and the target downsize ratio.

12. The method according to claim 11, wherein the pixel domain downsize ratio corresponds to the difference between the target downsize ratio and the size of the intermediate image.

13. The method according to claim 11, wherein said applying a pixel domain interpolation to the intermediate image comprises configuring an adaptive support pixel domain interpolator according to the pixel domain downsize ratio and applying the adaptive support pixel domain interpolator to intermediate image.

14. The method according to claim 13, wherein the adaptive support pixel domain interpolator is applied only to the Luma component of the intermediate image.

15. A system for downsizing an input disjoint block level encoded image, comprising:
a Discrete Cosine Transform (DCT) domain processor adapted to implement a DCT domain process, the DCT domain processor comprising:
a DCT downsize configurator adapted to calculate a DCT downsize ratio for downsizing the input image in a DCT domain according to a target downsize ratio and according to a size of a DCT transform length associated with the input image;
an I-DCT engine configured to adapt an I-DCT operation according to the DCT domain downsize ratio;
a DCT anti-aliasing filter ("AAF") configured to apply a DCT AAF to DCT coefficients corresponding to the input image according to the target downsize ratio;
said DCT domain processor is adapted to provide an intermediate image as output of the DCT domain process; and
a pixel domain processor adapted to apply a pixel domain interpolation operation to the intermediate image according to dimensions of the intermediate image and according to dimensions of the target image.

16. The system according to claim 15, wherein DCT downsize configurator is adapted to compute the DCT domain downsize ratio based on a length of the DCT transform and based on the target downsize ratio, for each dimension of the input image.

17. The system according to claim 15, wherein said I-DCT engine is configured to adapt one or both of a horizontal inverse transform length and a vertical inverse DCT transform length, according to the calculated DCT domain downsize ratio.

18. The system according to claim 15, wherein said I-DCT engine is adapted to reduce one or both of a horizontal inverse transform length and a vertical inverse transform length, according to the calculated DCT domain downsize ratios.

19. The system according to claim 17, further comprising a DCT AAF configured to apply a DCT AAF according to the target downsize ratio, and wherein said DCT AAF is configured to apply the DCT AAF to DCT coefficients corresponding to the input image prior to the operation of said I-DCT engine.

20. The system according to claim 17, wherein said DCT domain processor comprises a DCT AAF which is configured according to the target downsize ratio and according to dimensions of the image after the I-DCT operation, and said DCT AAF is adapted to apply a DCT AAF to DCT coefficients computed after said I-DCT operation giving rise to filtered DCT coefficients, and an additional I-DCT operation is applied to the filtered DCT coefficients, giving rise to the intermediate image.

21. The system according to claim 16, wherein said DCT downsize configurator is adapted to:
compute a ceiling expression over a ratio among the DCT transform length associated with the input image and the target downsize ratio, for each dimension of the input image, and
compute a ratio between the DCT transform length associated with the input image and the ceiling expression, for each dimension of the input image.

22. The system according to claim 15, wherein when the target downsize ratio received as input is larger than two, the DCT domain processor is adapted to implement a multi-iteration DCT downsizing process, and wherein:
said DCT downsize configurator is adapted to set the DCT domain downsize ratio to two for one or both dimensions of the input image, and accordingly dividing the target downsize ratio by two for one or both dimensions of the input image, respectively;
said I-DCT engine is configured to adapt an I-DCT operation according to the DCT domain downsize ratio;
said DCT downsize configurator and said I-DCT engine are configured to repeat a DCT downsizing process as long as the target downsize ratio following a previous iteration of the process is larger than two for one or both dimensions of the input image.

23. The system of claim 22, further comprising:
said DCT domain processor is adapted to perform an additional DCT after the final iteration of said multi-iteration DCT downsizing process,
said DCT AAF is configured according to the target downsize ratio and according to dimensions of the image after the adapted I-DCT of the final iteration of said multi-iteration DCT downsizing process, and said DCT AAF is configured to applying the DCT AAF to DCT coefficients corresponding to the image after the adapted I-DCT of the final iteration of said multi-iteration DCT downsizing process, giving rise to filtered DCT coefficients; and said DCT domain processor is adapted to perform I-DCT over the filtered DCT coefficients giving rise to the intermediate image.

24. The system according to claim 22, wherein as part of a final iteration of said multi-iteration DCT downsizing process, said DCT AAF is configured according to the target downsize ratio, and said DCT AAF is configured to apply a DCT AAF prior to said I-DCT engine performing the adapted I-DCT with respect to DCT coefficients corresponding to a result of a previous iteration of said multi-iteration DCT downsizing process.

25. The system according to claim 15, wherein said pixel domain processor is adapted to compute a pixel domain downsize ratio according to the dimensions of the intermediate image and the target image dimensions or according to the DCT domain downsize ratio and the target downsize ratio.

26. The system according to claim 25, wherein the pixel domain downsize ratio corresponds to the difference between the target downsize ratio and the size of the intermediate image.

27. The system according to claim 25, wherein said pixel domain processor is adapted to configure an adaptive support pixel domain interpolation algorithm according to the pixel domain downsize ratio, and is adapted to use the adaptive support pixel domain algorithm for downsizing the intermediate image.

28. The system according to claim 25, wherein pixel domain processor includes a Luma pixel domain downsize module that is configured to apply a pixel domain interpolation operation to the Luminance component of the intermediate image, and wherein the Luma pixel domain downsize module is adapted to use an adaptive support pixel domain interpolation algorithm and is adapted to use the adaptive support pixel domain algorithm for downsizing the Luma component of the intermediate image.

29. A program storage device readable by machine, tangibly embodying a program of instructions executable by the machine to perform a method of downsizing an input disjoint block level encoded image, comprising:
    calculating a Discrete Cosine Transform (DCT) downsize ratio for downsizing the input image in a DCT domain according to a target downsize ratio and according to a size of a DCT transform length associated with the input image;
    adapting an I-DCT according to the DCT domain downsize ratios, including configuring a DCT anti-aliasing filter ("AAF") according to the target downsize ratio, and applying the DCT AAF to DCT coefficients corresponding to the input image;
    performing the adapted I-DCT;
    providing an intermediate image as output of a DCT domain process; and
    applying a pixel domain interpolation to the intermediate image according to dimensions of the intermediate image and according to dimensions of the target image.

30. A computer program product comprising a computer useable medium having computer readable program code embodied therein of downsizing an input disjoint block level encoded image, the computer program product comprising:
    computer readable program code for causing the computer to calculate a Discrete Cosine Transform (DCT) downsize ratio for downsizing the input image in a DCT domain according to a target downsize ratio and according to a size of a DCT transform length associated with the input image;
    computer readable program code for causing the computer to adapt an I-DCT according to the DCT domain downsize ratios, said adapting including configuring a DCT anti-aliasing filter ("AAF") according to the target downsize ratio, and applying the DCT AAF to DCT coefficients corresponding to the input image;
    computer readable program code for causing the computer to perform the adapted I-DCT
    computer readable program code for causing the computer to provide an intermediate image as output of a DCT domain process; and
    computer readable program code for causing the computer to apply a pixel domain interpolation to the intermediate image according to dimensions of the intermediate image and according to dimensions of the target image.

* * * * *